July 11, 1944.    J. A. DORST    2,353,135
CARGO HANDLING APPARATUS
Filed June 26, 1943    4 Sheets-Sheet 1

Inventor
James A. Dorst
By
Attorneys

July 11, 1944.  J. A. DORST  2,353,135
CARGO HANDLING APPARATUS
Filed June 26, 1943  4 Sheets-Sheet 2
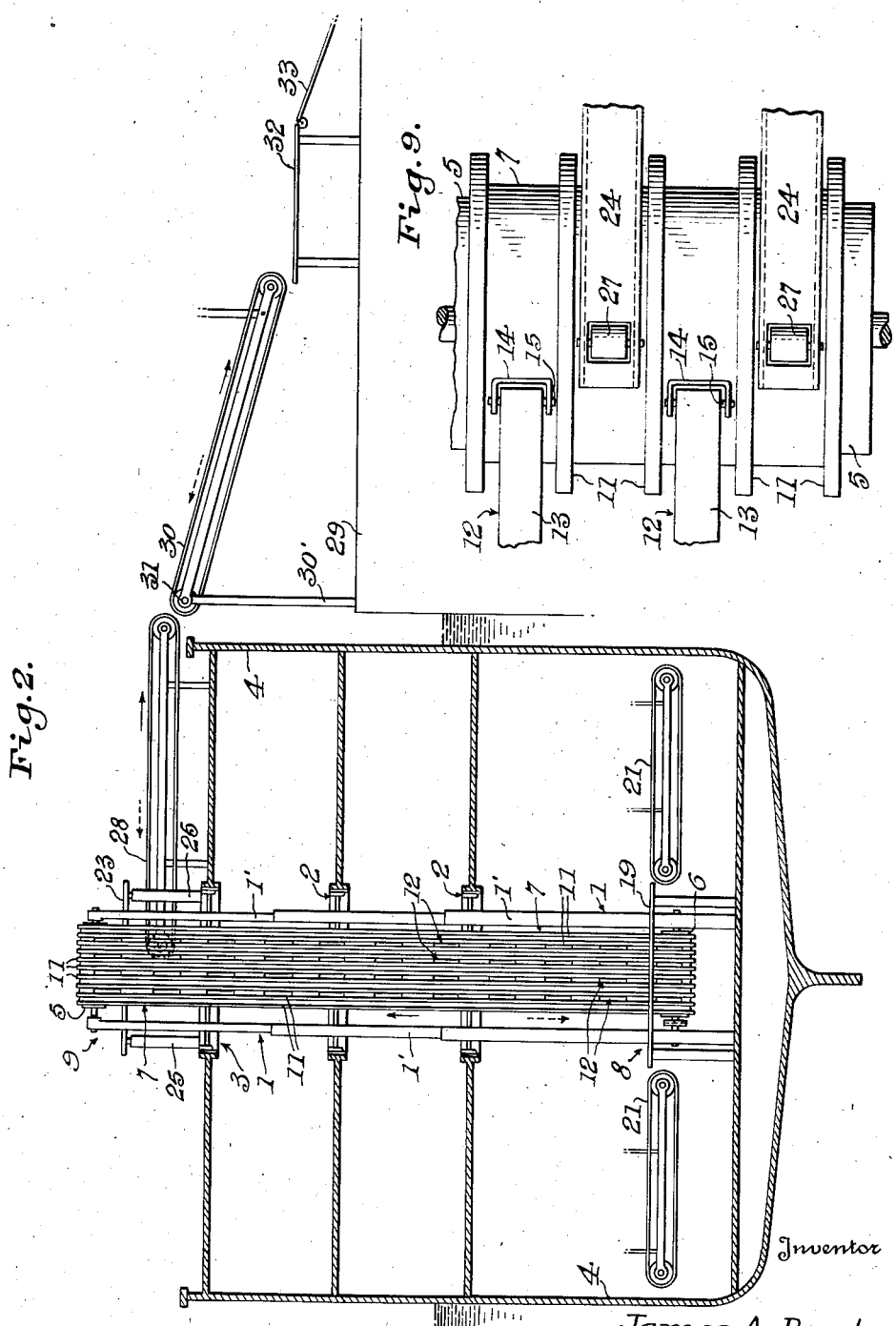

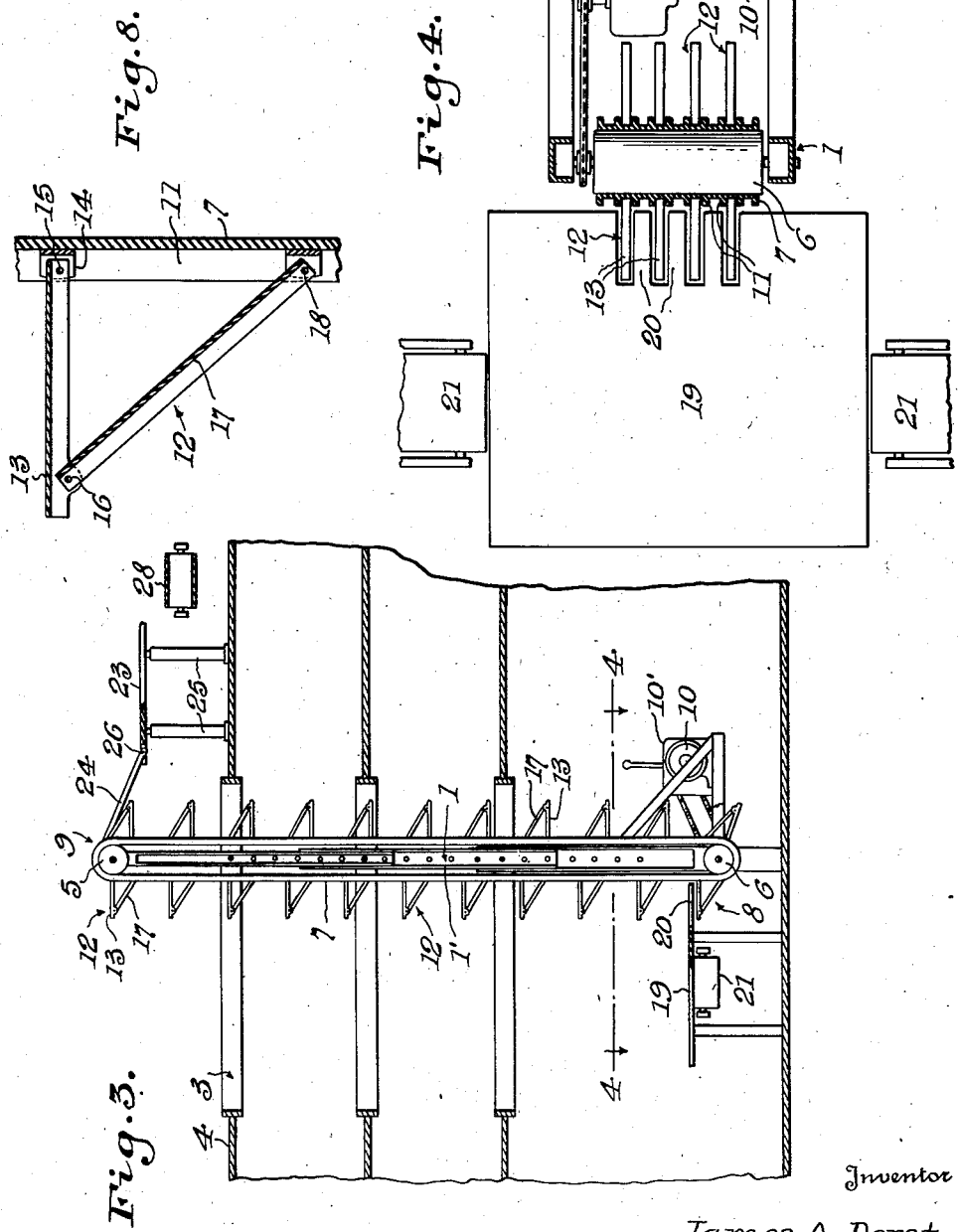

July 11, 1944.  J. A. DORST  2,353,135
CARGO HANDLING APPARATUS
Filed June 26, 1943  4 Sheets-Sheet 4

Inventor
James A. Dorst

Patented July 11, 1944

2,353,135

UNITED STATES PATENT OFFICE 2,353,135

CARGO HANDLING APPARATUS

James A. Dorst, United States Army, Geiger Field, Wash.

Application June 26, 1943, Serial No. 492,354

3 Claims. (Cl. 214—15)

(Granted under the act of March 3, 1883, as amended April 30, 1928; 370 O. G. 757)

The invention described herein may be manufactured and used by or for the Government for governmental purposes, without payment to me of any royalty thereon.

This invention relates to a cargo handling apparatus and the primary object thereof is to provide an apparatus of this character for facilitating the transference of cargo between a ship and a dock, whereby loading or unloading the ship may be accomplished in an expeditious and efficient manner.

Another object of the invention is to provide an apparatus in the form of a belt carrier system for loading or unloading cargo, particularly packages from or onto a ship for supplementing the ship's tackle in unloading or loading cargo from the ship and adapted to operate simultaneously therewith.

Another object of the invention is to provide a cargo handling apparatus of such size as to occupy a minimum space on the ship while in use, and including a portion adapted to be quickly placed in an operative position within a hatchway for loading or unloading cargo from a ship, and readily adapted to be moved from one hatchway to another.

Another object of the invention is to provide a cargo handling apparatus which is simple in construction, compact, durable, flexible, inexpensive to manufacture, and economical in operation.

Another object of the invention is to provide a cargo handling apparatus in which two or more cargo lifters may be placed in one hatchway of a ship and operated in connection with the ship's tackle or cranes, whereby the loading or unloading of the ship's cargo is greatly facilitated, thus materially reducing the time a ship need remain in port, particularly during war, and consequently the overall time required by a vessel to complete a round trip to various ports.

Briefly stated, the improved cargo handling apparatus comprises an extensible support adapted to be removably mounted in the hatchway of a ship and having a suitably driven resilient cargo lifter belt including a loading point and an unloading point mounted thereon. The cargo lifter belt is provided with ridges and has a plurality of cargo carrier members including fingers pivotally mounted thereon between certain of the ridges. A sorting table including fingers provided adjacent the loading point of said cargo lifter belt and a transfer table including fingers provided adjacent to the unloading point of said cargo lifter belt, together with a plurality of cargo conveyor belts, are also provided in carrying out the invention. The sorting table may be supplied with cargo from transversely extending endless belts which in turn may be supplied with the cargo from longitudinally extending belts. The transfer table is placed on the upper deck of the ship adjacent to the unloading point of the cargo lifter belt and has vertically adjustable legs provided thereon. The fingers of the transfer table are pivotally connected at their inner ends to one end of the transfer table and are inclined upwardly from the table toward the unloading point of the cargo lifter belt when the adjustable legs of the transfer table are shortened vertically in unloading the cargo from the ship. The outer free upper ends of the fingers of the transfer table are provided with rollers which engage the cargo lifter belt at the unloading point thereof between certain of the other ridges of the lifter belt.

The cargo from the transversely and longitudinally extending belts is placed on the fingers of the sorting table and the fingers of the cargo carrying members, which are adapted to pass between the fingers of the sorting table, pick up the cargo, whereby it is carried up by the cargo lifter belt to the unloading point. Upon a cargo carrying member reaching the unloading point of the lifter belt, it is rotated substantially 90° and the fingers of the cargo carrying members, which fingers are adapted to pass between the fingers of the transfer table deposit the cargo on the fingers of the transfer table, whereby the cargo is caused to slide down on the fingers of the transfer table and be deposited on the transfer table. From the transfer table the cargo is placed on a suitably driven endless belt arranged across the upper deck of the ship and from the deck crossing belt, the cargo is caused to pass to another endless belt extending downwardly to a distributing table from which the cargo is placed on a flap or chute for loading the cargo onto a truck or the like.

For loading cargo onto the ship, the transfer table is increased in height by means of its adjustable legs, whereby the fingers pivotally connected to the transfer table are caused to be inclined downwardly toward the cargo lifter belt and with the movement of the endless belts and cargo lifter belt being actuated in a reverse direction from the direction in unloading the ship, the cargo may be loaded onto the ship.

With the above and other objects and advantages in view, the invention consists of certain features of construction and operation of parts which will hereinafter be described and illustrated in the accompanying drawings, in which:

Fig. 2 is a transverse sectional view taken on the line 2—2 of Fig. 1 and illustrating the ship adjacent to a wharf, with a portion of the cargo handling apparatus mounted on the wharf;

Fig. 3 is a longitudinal section taken on the line 3—3 of Fig. 1;

Fig. 4 is a horizontal sectional view taken on the line 4—4 of Fig. 3;

Fig. 8 is a detail vertical sectional view taken on line 8—8 of Fig. 7;

Fig. 9 is a fragmentary detail plan view looking in the direction of arrow *a* in Fig. 6.

Figure 1:
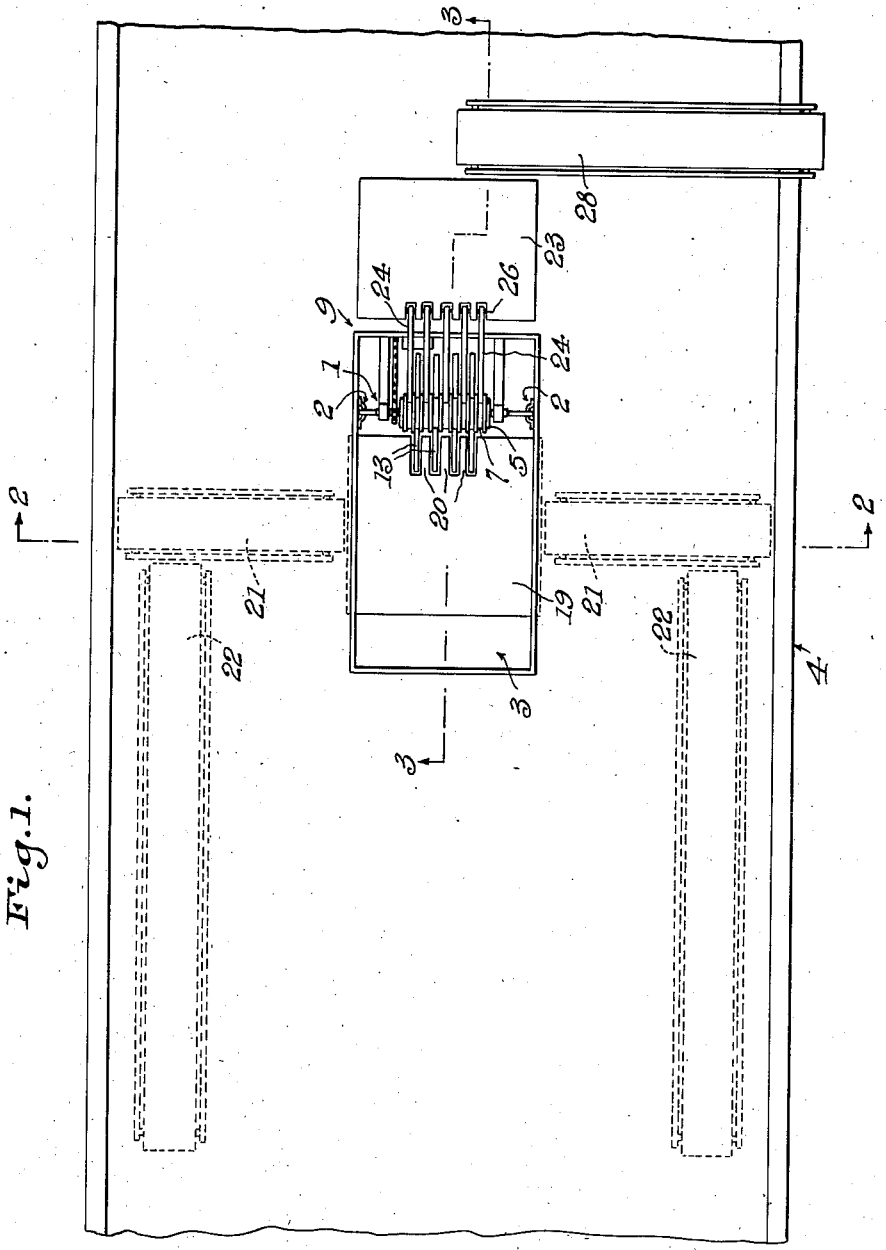
Fig. 1 is a plan view of a portion of a ship and showing the improved cargo handling apparatus in position to transfer cargo from the ship, with a portion of the cargo handling apparatus removably mounted in a hatchway of the ship.

In the illustrated embodiment characterizing the invention 1 indicates a vertically extensible cargo carrier support, such as a frame removably mounted on brackets 2 within the hatchway 3 of a ship 4 and made of a plurality of extensible sections 1'. The cargo carrier support 1 is provided with rollers 5 and 6 on its upper and lower ends respectively, which rollers 5 and 6 carry an endless cargo lifter belt 7 made of any suitable resilient material such as rubber and having a loading point 8 at the bottom end thereof and an unloading point 9 at its upper end. The cargo lifter belt 7 is driven on the rollers 5 and 6 by any suitable means such as by a sprocket chain driven by a reversible electric motor 10 through speed reduction gearing 10' and has a plurality of longitudinally extending endless ridges 11 formed thereon. A plurality of cargo carrier members 12 in the form of baskets or trays are mounted at suitably spaced intervals on the lifter belt 7, which cargo carrier members 12 comprise fingers 13 pivotally mounted at one of their ends by means of holders 14 and pins 15 to the cargo lifter belt 7 between certain of the ridges 11 thereof and pivotally mounted at their other ends at 16 to one of the ends of struts or brackets 17, which in turn are pivotally connected at their other ends at 18 to the cargo lifter belt 7 between the same ridges 11 as the fingers 13, as illustrated in Fig. 8.

A cargo sorting table 19 including fingers 20 is provided on a lower deck of the ship adjacent to the loading point 8 of the lifter belt 7, which sorting table 19 may be supplied with cargo on the ship from suitably driven transversely extending conveyor belts 21 and longitudinally extending conveyor belts 22. A transfer table 23 including fingers 24 and adjustable legs 25 is mounted on the upper deck of the ship adjacent to the unloading point 9 at the upper end of the lifter belt 7. The legs 25 may be vertically adjustable in any suitable manner. The fingers 24 are pivotally connected at their inner ends at 26 to the transfer table 23 and the table 23 is so lowered by means of the adjustable legs 25 in unloading cargo from the ship that the fingers 24 are inclined downwardly from the unloading point 9 of the lifter belt 7 to the transfer table. The upper or free ends of the fingers 24 of the transfer table 23 are provided with rollers or wheels 27 adapted to ride on the cargo lifter belt 7 between certain of the other ridges 11 thereof. A suitably driven endless cargo conveyor belt 28 extends from the transfer table 23 across the upper deck to one side of the ship adjacent to a wharf 29 or the like, and another suitably driven endless cargo conveyor belt 30 is mounted at one end 31 to a support 30' provided on the wharf 29. The conveyor belt 30 may be swively mounted at its end 31 to the support 30' and extends outwardly and downwardly from the outer end of the conveyor belt 28 to a distributing table 32 provided on the wharf 29 and a flap or chute 33 is connected at one end to the distributing table 32 provided on the wharf 29 and a flap or chute 33 is connected at one end to the distributing table whereby any cargo may be discharged into a truck or the like (not shown).

Figure 5:
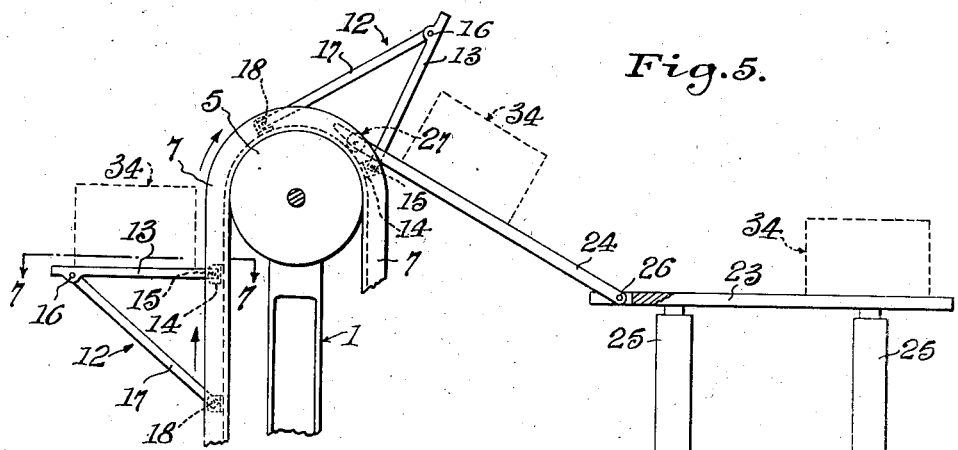
Fig. 5 is a fragmentary view of the upper portion of the cargo handling apparatus with parts in position for unloading cargo from a ship.
Figure 7:
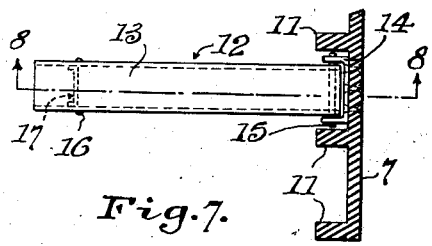
Fig. 7 is a detail horizontal section taken on line 7—7 of Fig. 5, illustrating portions of a cargo lifter belt and cargo carrier member used in carrying out the invention.

In operation, assuming the resilient endless cargo lifter belt 7 is driven on the cargo carrier support 1 in the direction as indicated by the arrows by the reversible electric motor 10 for unloading cargo in the form of packages 34 from the ship and that the packages 34 have been conveyed to the sorting table 19 by the conveyor belts 21 and 22, the cargo packages are placed on the sorting table 19 and the fingers 13 of the cargo carrying members 12, which are adapted to pass between the fingers 20 of the sorting table pick up the packages 34 and carry them vertically upward through the hatchway 3 of the ship 4 by means of the cargo lifter belt 7 to the unloading point 9 thereof. Upon the cargo carrying members 12 reaching the unloading point 9 of the lifter belt 7 they are rotated substantially 90°, with their fingers 13 passing through the fingers 24 of the transfer table 23, whereby the packages 34 are deposited on the transfer table by sliding down the inclined fingers thereof (Fig. 5). The packages 34 are then placed on the conveyor belt 28 driven in any suitable manner in the direction as indicated by the arrow, which belt 28 is adapted to convey the packages across the upper deck of the ship to the conveyor belt 30, which in turn is adapted to convey the packages to the distributing table 32, from where the packages are placed on the inclined chute or flap 33 for delivery to a truck or the like.

Figure 6:
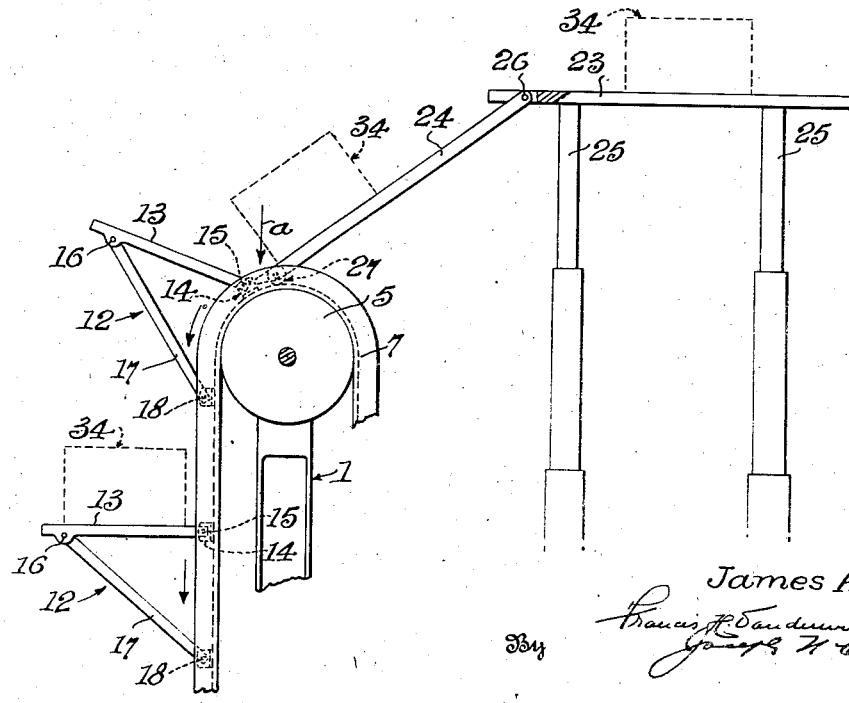
Fig. 6 is a similar view with the parts in position for loading the cargo onto the ship.

In loading cargo onto the ship, the transfer table 23 is raised a sufficient height by vertically adjusting its legs 25 so that the fingers 24 are inclined downwardly from the transfer table 23 to the upper end of the cargo lifter belt 7 (Fig. 6), whereby the cargo will slide down onto the cargo carrying members 12 and, assuming that the cargo lifter belt 7 is driven in a reverse direction from the direction in unloading the cargo, the cargo carrying members 12 will convey the cargo to the sorting table 19 and as the fingers 13 of the cargo carrying members 12 pass between the fingers 20 of the sorting table 19 the cargo will be deposited on the sorting table for distribution about the ship. Any suitable number of sorting tables may be placed on any number of decks of the ship for loading and unloading cargo.

It will thus be seen that there is herein provided a new and useful form of cargo handling apparatus which is well adapted for the purposes intended. Even though there has been herein shown and described certain features of construction and operation of parts, it is nevertheless to be understood that various changes may be made therein if the changes do not depart from the spirit or scope of the claims.

Having thus described my invention, what I claim as new and wish to secure by Letters Patent is:

1. A cargo handling apparatus, the combination with an extensible support adapted to be removably mounted in a hatchway of a ship, a resilient cargo lifter belt adapted to be driven on said support and having a loading point and an unloading point, ridges formed on said cargo lifter belt, a table provided adjacent to the loading point of the cargo lifting belt, another table provided adjacent the unloading point of the cargo lifter belt, fingers pivotally mounted at one of their ends to the second-mentioned table and engaging said cargo lifter belt at its other ends between certain of said ridges, a plurality of cargo carrying members pivotally mounted on the cargo lifter belt, between certain other of said ridges, said cargo carrying members adapted to carry cargo from the first-mentioned table at the loading point of the cargo lifter belt to said unloading point and to deposit the cargo on the fingers of said second-mentioned table.

2. A cargo handling apparatus, the combination with an extensible support adapted to be removably mounted in a hatchway of a ship, a resilient endless belt adapted to be driven on said support and having a loading point and an unloading point, ridges provided on said endless belt, a table provided adjacent to the loading point of the endless belt, another table including inclined fingers provided adjacent to said unloading point, one of the ends of said fingers pivotally connected to the second-mentioned table, rollers mounted on the other ends of said fingers and engaging between certain of said ridges of the endless belt at said unloading point and a plurality of cargo carrying members pivotally connected to the endless belt between certain of the other of said ridges thereof, said cargo carrying members adapted to carry cargo from the first-mentioned table at the loading point to said unloading point of the endless belt and to deposit the cargo on the inclined fingers of the second-mentioned table.

3. A cargo handling apparatus, the combination with an extensible support adapted to be removably mounted in a hatchway of a ship, an endless belt mounted to be driven on said support, and including a lower loading end and an upper unloading end, cargo carrying members including fingers pivotally mounted on said endless belt, a sorting table including fingers provided adjacent to the lower loading end of said endless belt, a transfer table mounted adjacent to the upper unloading end of the endless belt, said transfer table including fingers and vertically adjustable legs, said last-mentioned fingers pivotally connected at one of their ends to the transfer table and adapted to engage said endless belt at their other ends, said fingers on said cargo carrying members adapted to pass through said fingers on the sorting and transfer tables, whereby cargo may be picked up by the fingers on the cargo carrying members from the fingers of said sorting table and conveyed by the endless belt to the upper unloading end thereof and then picked up by the fingers on the transfer table for unloading cargo from the ship, said transfer table adapted to be raised by its adjustable legs for causing the fingers thereof to be inclined downwardly toward said endless belt, whereby cargo may be loaded onto the ship.

JAMES A. DORST.